(12) United States Patent
Kitamura et al.

(10) Patent No.: US 9,897,446 B2
(45) Date of Patent: Feb. 20, 2018

(54) PHYSICAL QUANTITY DATA CORRECTING DEVICE AND PHYSICAL QUANTITY DATA CORRECTING METHOD

(71) Applicant: ASAHI KASEI MICRODEVICES CORPORATION, Tokyo (JP)

(72) Inventors: Toru Kitamura, Tokyo (JP); Munehiro Kitaura, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 52 days.

(21) Appl. No.: 14/385,296

(22) PCT Filed: Mar. 5, 2014

(86) PCT No.: PCT/JP2014/001215
§ 371 (c)(1),
(2) Date: Sep. 15, 2014

(87) PCT Pub. No.: WO2014/141631
PCT Pub. Date: Sep. 18, 2014

(65) Prior Publication Data
US 2016/0273915 A1    Sep. 22, 2016

(30) Foreign Application Priority Data
Mar. 15, 2013 (JP) .................. 2013-053843

(51) Int. Cl.
G01C 17/38  (2006.01)
G01D 3/02   (2006.01)
G01C 17/02  (2006.01)

(52) U.S. Cl.
CPC ............. *G01C 17/38* (2013.01); *G01C 17/02* (2013.01); *G01D 3/022* (2013.01)

(58) Field of Classification Search
USPC .............................................. 702/92, 93, 94
See application file for complete search history.

(56) References Cited

U.S. PATENT DOCUMENTS 4,539,760 A    9/1985  Marchent et al.
4,611,293 A    9/1986  Hatch et al.
(Continued)

FOREIGN PATENT DOCUMENTS

JP    H01-500618 A    3/1989
JP    H04-077845 B2   12/1992
(Continued)

OTHER PUBLICATIONS

International Preliminary Report on Patentability dated Sep. 15, 2015, for the corresponding International application No. PCT/JP2014/001215.
(Continued)

*Primary Examiner* — Lam Nguyen
(74) *Attorney, Agent, or Firm* — Morgan, Lewis & Bockius LLP

(57) ABSTRACT

A physical quantity data correcting device accurately and rapidly makes corrections of physical quantity data by appropriately controlling an approximate ellipsoid computing unit and/or a correction coefficient computing unit on the basis of a control parameter group. A physical quantity data acquiring unit acquires physical quantity data output from a physical quantity detecting unit that detects physical quantities. A data selecting unit selects the acquired physical quantity data. An approximate ellipsoid computing unit computes an approximate expression of an n-dimensional ellipsoid indicating a distribution shape obtained by distributing the selected physical quantity data in an n-axis coordinate space. A correction coefficient computing unit computes correction coefficients for correcting the computed n-dimensional ellipsoid to an n-dimensional sphere. A computation control unit controls the approximate ellipsoid computing unit and/or the correction coefficient computing unit on the basis of a control parameter group. A correction data output unit corrects the physical quantity data.

4 Claims, 16 Drawing Sheets

(56) References Cited

U.S. PATENT DOCUMENTS

| | | |
|---|---|---|
| 5,117,375 A | 5/1992 | Worcester et al. |
| 2002/0100178 A1 | 8/2002 | Smith et al. |
| 2003/0167121 A1 | 9/2003 | Ockerse et al. |
| 2005/0223573 A1 | 10/2005 | Fillatreau et al. |
| 2005/0228603 A1 | 10/2005 | Fillatreau et al. |
| 2005/0256673 A1 | 11/2005 | Hikida et al. |
| 2007/0055468 A1 | 3/2007 | Pylvänäinen |
| 2008/0071492 A1 | 3/2008 | Skvortsov et al. |
| 2013/0006573 A1 | 1/2013 | Brunner et al. |

FOREIGN PATENT DOCUMENTS

| | | |
|---|---|---|
| JP | 2000-009468 A | 1/2000 |
| JP | 2004-525347 A | 8/2004 |
| JP | 2005-519278 A | 6/2005 |
| JP | 2008-076397 A | 4/2008 |
| WO | 2004/003476 A1 | 1/2004 |

OTHER PUBLICATIONS

English translation of the Written Opinion dated Jun. 10, 2014, for International application No. PCT/JP2014/001215.
International Search Report dated Jun. 10, 2014 for International Application No. PCT/JP2014/001215.
European Search Report dated Oct. 20, 2015 for the corresponding European Patent Application No. 14761268.3.

——— with Hard-Iron    ------ Ideal

——— with Soft-Iron    ------ Ideal

○ PHYSICAL QUANTITY DATA ······· CORRECT APPROXIMATE ELLIPSOID
——— EXAMPLE OF ERRONEOUSLY-CALCULATED
APPROXIMATE ELLIPSOID

○ PHYSICAL QUANTITY DATA ······· CORRECT APPROXIMATE ELLIPSOID

FIG. 20

| | x | y | z |
|---|---|---|---|
| NEW DATA | -3 | -20 | 24 |

PHYSICAL QUANTITY DATA BUFFER:

| No. | x | y | z | LIFETIME | DIFFERENCE |
|---|---|---|---|---|---|
| 1 | 41 | -47 | -35 | 56 | 78 |
| 2 | 17 | -15 | 11 | 50 | 24 |
| 3 | 16 | 35 | 37 | 49 | 60 |
| 4 | 21 | -23 | 5 | 47 | 31 |
| 5 | 22 | 44 | 33 | 43 | 69 |
| 6 | 1 | -13 | -45 | 35 | 69 |
| 7 | 6 | 25 | 40 | 30 | 49 |
| 8 | -11 | 24 | 36 | 20 | 46 |

| No. | x | y | z | LIFETIME |
|---|---|---|---|---|
| 1 | -3 | -20 | 24 | 64 |
| 2 | 41 | -47 | -35 | 56 |
| 3 | 17 | -15 | 11 | 50 |
| 4 | 16 | 35 | 37 | 49 |
| 5 | 21 | -23 | 5 | 47 |
| 6 | 22 | 44 | 33 | 43 |
| 7 | 1 | -13 | -45 | 35 |
| 8 | 6 | 25 | 40 | 30 |

FIG. 21

| | x | y | z |
|---|---|---|---|
| NEW DATA | -3 | -20 | 24 |

| No. | x | y | z | LIFETIME | DIFFERENCE |
|---|---|---|---|---|---|
| 1 | -12 | 47 | -47 | 56 | 98 |
| 2 | -36 | 11 | -21 | 50 | 64 |
| 3 | -9 | -22 | 31 | 49 | 9 |
| 4 | -45 | -33 | -9 | 47 | 55 |
| 5 | -44 | 17 | 14 | 43 | 56 |
| 6 | 33 | -10 | -22 | 35 | 59 |
| 7 | -2 | -20 | 28 | 30 | 4 |
| 8 | -47 | 35 | -17 | 20 | 81 |

| No. | x | y | z | LIFETIME |
|---|---|---|---|---|
| 1 | -12 | 47 | -47 | 56 |
| 2 | -36 | 11 | -21 | 50 |
| 3 | -9 | -22 | 31 | 49 |
| 4 | -45 | -33 | -9 | 47 |
| 5 | -44 | 17 | 14 | 43 |
| 6 | 33 | -10 | -22 | 35 |
| 7 | -2 | -20 | 28 | 30 |
| 8 | -47 | 35 | -17 | 20 |

FIG. 22

| | x | y | z |
|---|---|---|---|
| NEW DATA | -3 | -20 | 24 |

| No. | x | y | z | LIFETIME | DIFFERENCE |
|---|---|---|---|---|---|
| 1 | -3 | -21 | 16 | 56 | 8 |
| 2 | -2 | 37 | 30 | 50 | 57 |
| 3 | 31 | 26 | -6 | 49 | 65 |
| 4 | 34 | -36 | 20 | 47 | 41 |
| 5 | -40 | -45 | -30 | 43 | 70 |
| 6 | 38 | 26 | -47 | 35 | 94 |
| 7 | -12 | 37 | -7 | 30 | 66 |
| 8 | 17 | 21 | 45 | 20 | 50 |

| No. | x | y | z | LIFETIME |
|---|---|---|---|---|
| 1 | -3 | -20 | 24 | 64 |
| 2 | -2 | 37 | 30 | 50 |
| 3 | 31 | 26 | -6 | 49 |
| 4 | 34 | -36 | 20 | 47 |
| 5 | -40 | -45 | -30 | 43 |
| 6 | 38 | 26 | -47 | 35 |
| 7 | -12 | 37 | -7 | 30 |
| 8 | 17 | 21 | 45 | 20 |

PHYSICAL QUANTITY DATA CORRECTING DEVICE AND PHYSICAL QUANTITY DATA CORRECTING METHOD

TECHNICAL FIELD

The present invention relates to a physical quantity data correcting device and a physical quantity data correcting method, and more particularly, to a physical quantity data correcting device and a physical quantity data correcting method that can accurately and rapidly make a correction even under an influence of a variation in an external environment or a disturbance.

BACKGROUND ART

With the recent spread of portable devices such as mobile phones, smart phones, and tablet terminals, need for a pedestrian navigation system has increased and demand for an azimuth measuring device that measures a current position and a travel direction of a pedestrian and that can be mounted on portable devices has increased.

Devices such as a game controller, a television remote controller, or a digital camera have been progressively equipped with sensor components for measuring a physical quantity, such as a geomagnetic sensor or an acceleration sensor for the purpose of providing a function corresponding to a user's taste or state.

In general, plural components are arranged in the electronic devices and components giving an influence to the sensor components are often used.

For example, in a geomagnetic sensor, ideally-measured geomagnetic values are generally distributed in a spherical shape centered on an origin (geomagnetic measurement sphere). However, due to influences of magnetic components present around the measuring device, the measured geomagnetic values are not actually distributed in a spherical shape centered on an origin.

FIG. 1 is a diagram schematically illustrating a hard magnetic material effect (Hard-Iron Effect). In FIG. 1, a two-dimensional shape is illustrated for the purpose of simplification. (hereinafter, a two-dimensional shape is illustrated in the drawings for the purpose of simplification but the same is true of three or more dimensions.) When the magnetic component giving an influence to a measuring device is a component exhibiting hard magnetism such as a magnet, measured geomagnetic values have offsets and are distributed in a spherical shape centered on a vector corresponding to an offset magnetic field.

FIG. 2 is a diagram schematically illustrating a soft magnetic material effect (Soft-Iron Effect). When the magnetic component giving an influence to a measuring device is a component exhibiting soft magnetism, such as iron, the measured geomagnetic values are deformed and distributed in an ellipsoidal shape.

Since the influence of the offset magnetic field or the deformation of the distribution shape causes an azimuth error, it is necessary to correct the influences thereof so as to obtain a correct azimuth.

As a method of correcting an influence of a hard magnetic material, for example, PTL 1 discloses an azimuth measuring device and an azimuth measuring method using geomagnetism detecting means and more particularly an azimuth measuring device and an azimuth measuring method that are suitable for correcting an offset of a magnetic sensor, in which an offset obtained when physical quantity data is distributed on a spherical surface is calculated.

As a method of correcting an influence of a soft magnetic material, for example, PTL 2 discloses a fundamental computation technique for correcting obtained ellipsoidal data so as to be distributed in a spherical shape when physical quantity data to be originally distributed in a spherical shape is distributed in an ellipsoidal shape.

CITATION LIST

Patent Literature

PTL 1: PCT Japanese Translation Patent Republication No. 2004-003476
PTL 2: U.S. Pat. No. 5,117,375

SUMMARY OF INVENTION

Technical Problem

However, PTL 1 does not disclose a configuration and a method of causing a computation control unit to appropriately control an approximate ellipsoid computing unit and/or a correction coefficient computing unit on the basis of a control parameter group, which are described in the present invention.

PTL 2 discloses the fundamental computation technique for correcting the obtained ellipsoidal data so as to be distributed in a spherical shape when physical quantity data to be distributed in a spherical shape is distributed in an ellipsoidal shape, but since a variation in an external environment or a disturbance is present under actual environments, it is difficult to accurately and rapidly make a correction even when the fundamental computation technique is known.

The present invention is made in consideration of the above-mentioned problems and an object thereof is to provide a physical quantity data correcting device and a physical quantity data correcting method that can accurately and rapidly make a correction even under an influence of a variation in an external environment or a disturbance by causing a computation control unit to appropriately control an approximate ellipsoid computing unit and/or a correction coefficient computing unit on the basis of a control parameter group.

Solution to Problem

The present invention is made to achieve the above-mentioned object and is characterized by the following configurations.

(1) There is provided a physical quantity data correcting device including: a physical quantity data acquiring unit that acquires physical quantity data output from an n-axis (where n is an integer of two or greater) physical quantity detecting unit; an approximate ellipsoid computing unit that computes an approximate expression of an n-dimensional ellipsoid approximating a distribution shape obtained by distributing the physical quantity data in an n-axis coordinate space; a correction coefficient computing unit that computes a correction coefficient for correcting the n-dimensional ellipsoid to an n-dimensional sphere; a computation control unit that controls at least one of the approximate ellipsoid computing unit and the correction coefficient computing unit on the basis of a control parameter group; and a correction data output unit that corrects the physical quantity data on the basis of the correction coefficient and that outputs the corrected physical quantity data.

(2) The physical quantity data correcting device may further include a data selecting unit that selects some physical quantity data out of the physical quantity data acquired by the physical quantity data acquiring unit on the basis of an n-dimensional volume of the distribution shape obtained by distributing the physical quantity data in the n-axis coordinate space and that outputs the selected physical quantity data to the approximate ellipsoid computing unit.

(3) The computation control unit may include a plurality of control parameter groups including a plurality of control parameters, the computation control unit may include an accuracy setting unit that sets accuracy of the corrected physical quantity data, and the computation control unit may select one control parameter group from the plurality of control parameter groups on the basis of the accuracy set by the accuracy setting unit and may control the computation using the selected control parameter group.

(4) The control parameter group may include a parameter for designating a range of elapsed time after data included in a group of the physical quantity data is measured.

(5) The correction coefficient computing unit may compute the correction coefficient on the basis of a correction coefficient candidate group including a plurality of correction coefficient candidates.

(6) The control parameter group may include a parameter for designating a range of elapsed time after the correction coefficient candidates included in the correction coefficient candidate group are computed.

(7) The control parameter group may include a parameter for designating a range of deviations of the correction coefficient candidates included in the correction coefficient candidate group.

(8) The control parameter group may include a parameter for designating a range of the number of valid correction coefficient candidates out of the correction coefficient candidates included in the correction coefficient candidate group.

(9) The plurality of correction coefficient candidates may be correction coefficients previously output from the correction coefficient computing unit.

(10) The control parameter group may include a parameter for designating a range of differences between the physical quantity data previously acquired by the physical quantity data acquiring unit and the physical quantity data newly acquired by the physical quantity data acquiring unit.

(11) The control parameter group may include a parameter for evaluating validity of the computation of the approximate ellipsoid computing unit or validity of the computation of the correction coefficient computing unit.

(12) The parameter for evaluating the validity of the computation of the approximate ellipsoid computing unit or the validity of the computation of the correction coefficient computing unit may be a parameter based on the n-dimensional volume of the distribution shape obtained by distributing the physical quantity data in the n-axis coordinate space.

(13) The control parameter group may include a parameter for designating a range of disagreement between the distribution shape of the physical quantity data and the n-dimensional ellipsoid.

(14) The control parameter group may include a parameter for designating a range of flatness of the distribution of the physical quantity data.

(15) The control parameter group may include a parameter for designating a range of an axial length of the n-dimensional ellipsoid.

(16) The control parameter group may include a parameter for designating a range of the n-dimensional volume of the n-dimensional ellipsoid.

(17) The computation control unit may include a correction coefficient storage unit that stores an existing correction coefficient computed in the past, and the control parameter group may include a parameter for evaluating validity of the existing correction coefficient.

(18) When the validity of the existing correction coefficient is high, the computation control unit may control the correction coefficient computing unit so as not to perform the computation of the correction coefficient computing unit.

(19) When the validity of the existing correction coefficient is low, the computation control unit may reset the existing correction coefficient stored in the correction coefficient storage unit.

(20) There is provided a physical quantity data correcting method including: a physical quantity data acquiring step of acquiring physical quantity data output from an n-axis (where n is an integer of two or greater) physical quantity detecting unit; an approximate ellipsoid computing step of computing an approximate expression of an n-dimensional ellipsoid approximating a distribution shape obtained by distributing the physical quantity data in an n-axis coordinate space; a correction coefficient computing step of computing a correction coefficient for correcting the n-dimensional ellipsoid to an n-dimensional sphere; a computation control step of controlling at least one of the approximate ellipsoid computing step and the correction coefficient computing step on the basis of a control parameter group; and a correction data output step of correcting the physical quantity data on the basis of the correction coefficient and outputting the corrected physical quantity data.

(21) There is provided a program causing a computer to function as the physical quantity data correcting device according to any one of (1) to (19).

Advantageous Effects of Invention

According to the present invention, it is possible to implement a physical quantity data correcting device and a physical quantity data correcting method that can accurately and rapidly make a correction even under an influence of a variation in an external environment or a disturbance by causing a computation control unit to appropriately control an approximate ellipsoid computing unit and/or a correction coefficient computing unit on the basis of a control parameter group.

BRIEF DESCRIPTION OF DRAWINGS

FIG. 20 is a diagram illustrating an (first) example of a method of loading new physical quantity data to a physical quantity data buffer;

FIG. 21 is a diagram illustrating an (second) example of the method of loading new physical quantity data to the physical quantity data buffer;

FIG. 22 is a diagram illustrating an (third) example of the method of loading new physical quantity data to the physical quantity data buffer;

DESCRIPTION OF EMBODIMENTS

Figure 1:
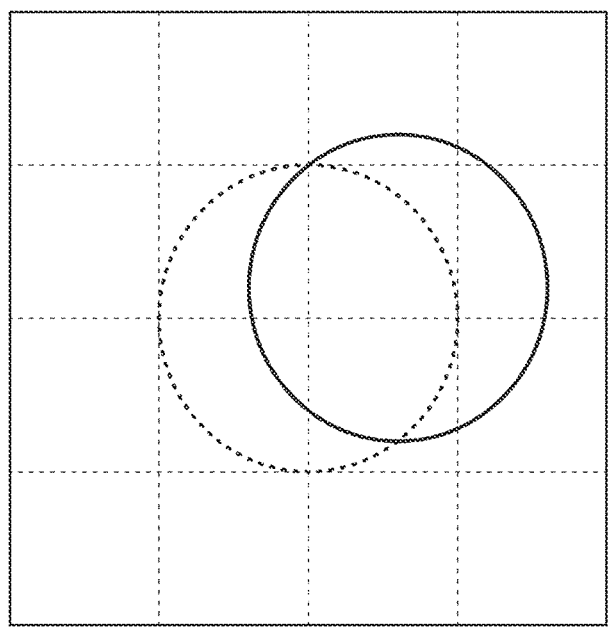
FIG. 1 is a diagram schematically illustrating a hard magnetic material effect (Hard-Iron Effect)
Figure 2:
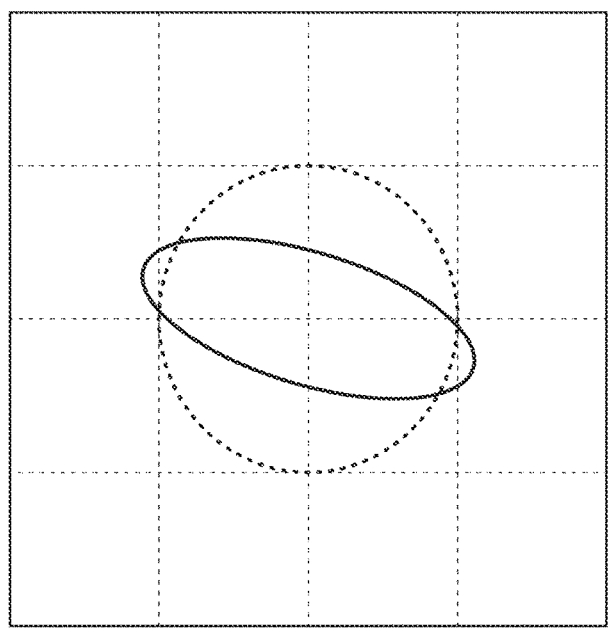
FIG. 2 is a diagram schematically illustrating a soft magnetic material effect (Soft-Iron Effect)

First, mathematic computation required for putting the present invention into practice will be schematically described below.

Physical quantity data under an ideal environment is defined as $X_{ideal}$ and physical quantity data affected by a variation in an external environment or a disturbance is defined as $X_{meas.}$. $X_{ideal}$ has a spherical distribution and $X_{meas.}$ has an ellipsoidal distribution. Here, $X_{ideal}$ and $X_{meas.}$ can be expressed by the following relational expressions.

[Math 1]

$$x_{meas.} = \alpha D x_{ideal} + o$$

$$x_{ideal} = \alpha^{-1} D^{-1} (x_{meas.} - o) \qquad (1)$$

Here, $\alpha$ is a scalar value, $X_{ideal}$, $X_{meas.}$, and $o$ are n-dimensional vectors, and D is an n×n matrix of which the determinant value is 1.

The physical quantity data $X_{ideal}$ under an ideal environment is distributed in a spherical shape and thus the following expression is established with the radius of the n-dimensional sphere as R.

[Math 2]

$$(x_{ideal})^t x_{ideal} = R^2 \qquad (2)$$

The following expression is established for $X_{meas.}$ from Expressions (1) and (2).

[Math 3]

$$(\alpha R)^2 = (x_{meas.} - o)^t A (x_{meas.} - o)$$

$$A \equiv (D^{-1})^t D^{-1} \qquad (3)$$

A, o, and $\alpha R$ in Expression (3) are parameters characterizing the distribution of the physical quantity data $X_{meas.}$, and computation of an approximate ellipsoid in the present invention corresponds to calculation of these parameters.

Here, A is generally an n×n real non-singular matrix and thus can be diagonalized and can be expressed as follows, where U represents an orthogonal matrix for diagonalizing A and $\Lambda$ represents a diagonal matrix including eigenvalues of A.

[Math 4]

$$A = U^t \Lambda U \qquad (4)$$

$\Lambda$ is a diagonal matrix and thus the square root thereof can be extracted by taking a square root of diagonal components. When the square root of $\Lambda$ is defined as $\kappa$, Expression (4) can be modified as follows.

[Math 5]

$$A = (\kappa U)^t \kappa U \qquad (5)$$

The physical quantity data $X_{meas.}$ can be corrected using $\kappa U$ as follows.

[Math 6]

$$(\kappa U x_{meas.} - o)^t (\kappa U x_{meas.} - o) = (\alpha R)^2 \qquad (6)$$

Accordingly, it can be seen that the distribution of the corrected physical quantity data $\kappa U X_{meas.}$ is corrected to a spherical shape.

Therefore, the physical quantity data $X_{meas.}$ can be corrected from the ellipsoidal distribution to the spherical distribution by calculating $\kappa$ and U, and the computation of a correction coefficient in the present invention corresponds to calculation of these parameters. Here, o is a parameter for giving correction of an offset value, can be calculated in the course of computation of an approximate ellipsoid, and thus may be considered as a part of a correction coefficient. $\alpha$ is a parameter for giving correction of sensitivity, can be calculated using Expression (6) when the radius R of the physical quantity data $X_{ideal}$ is known in advance and thus may be considered as a part of a correction coefficient.

According to the present invention, it is possible to accurately and rapidly correct physical quantity data even under an influence of a variation in an external environment or a disturbance by causing a computation control unit to appropriately control an approximate ellipsoid computing unit and/or a correction coefficient computing unit on the basis of a control parameter group.

Hereinafter, embodiments of the present invention will be described with reference to the accompanying drawings.

Figure 3:
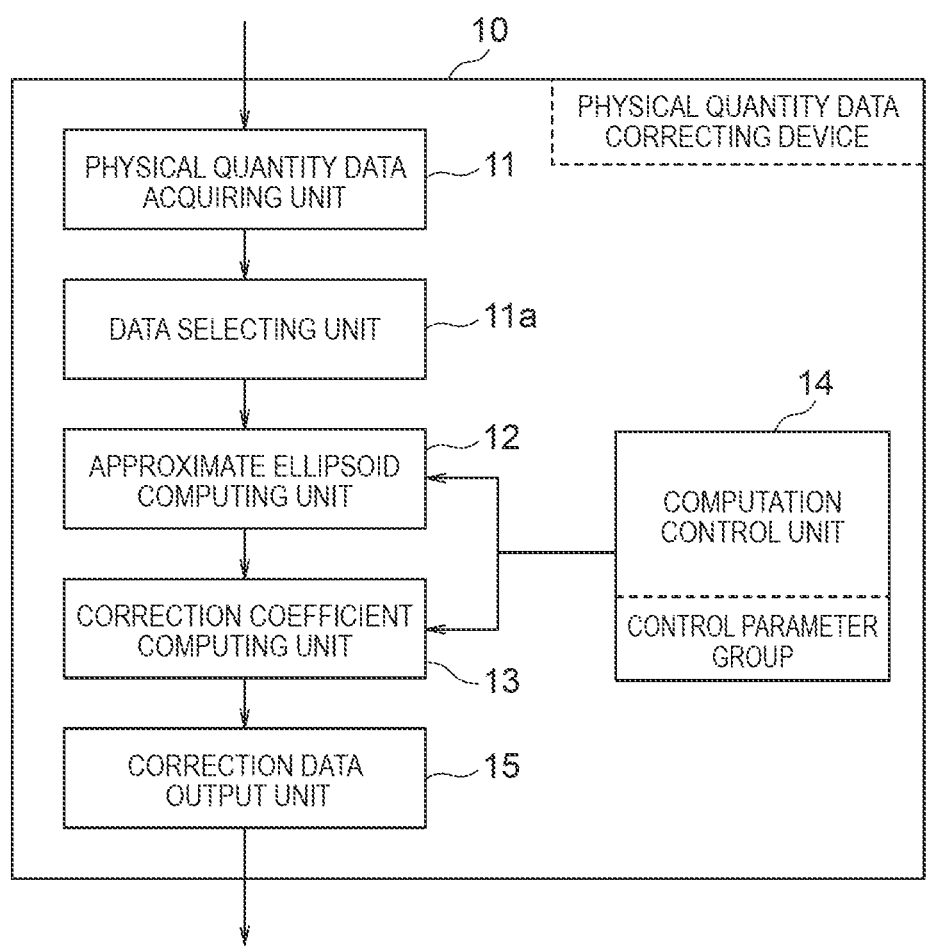
FIG. 3 is a block diagram illustrating a configuration of a physical quantity data correcting device according to the present invention.

FIG. 3 is a block diagram illustrating a configuration of a physical quantity data correcting device according to the present invention. In the drawing, reference numeral 10 represents a physical quantity data correcting device, reference numeral 11 represents a physical quantity data acquiring unit, reference numeral 11a represents a data selecting unit, reference numeral 12 represents an approximate ellipsoid computing unit, reference numeral 13 represents a correction coefficient computing unit, reference numeral 14 represents a computation control unit, and reference numeral 15 represents a correction data output unit.

Figure 4:
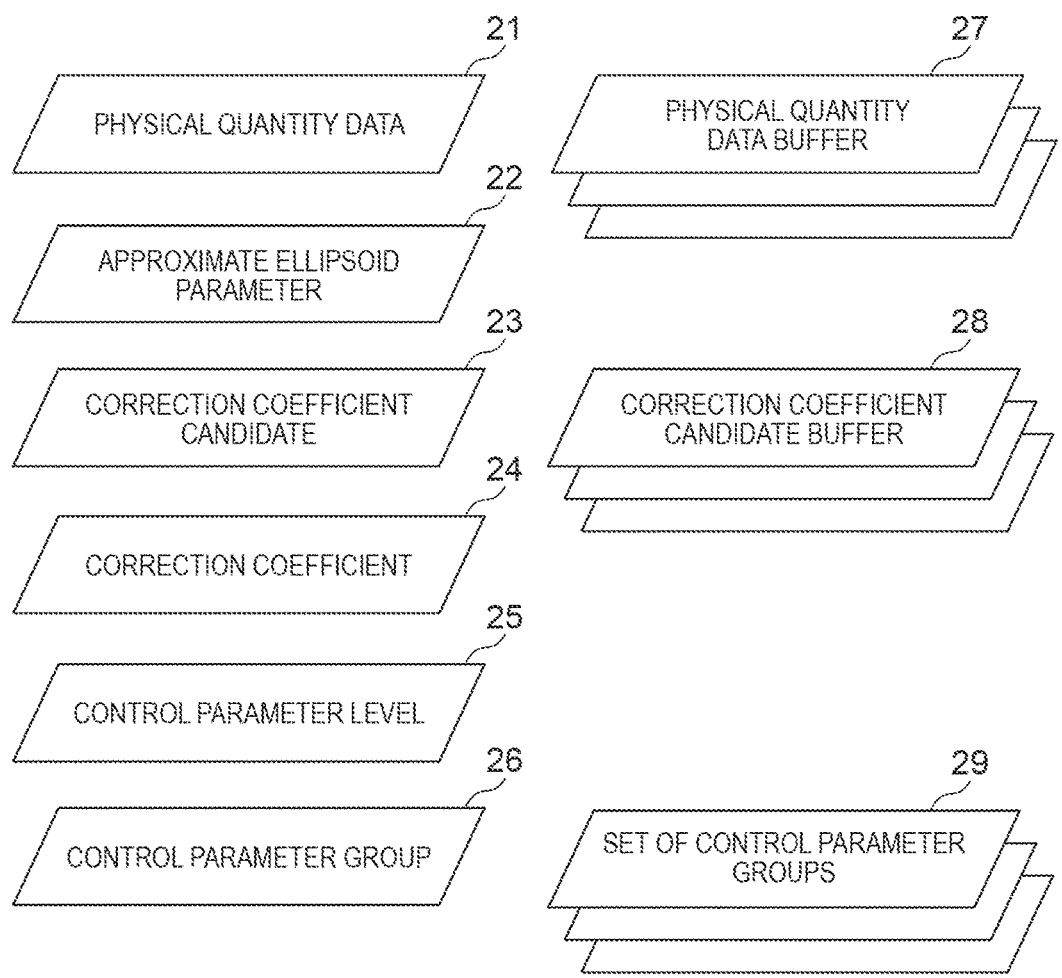
FIG. 4 is a diagram illustrating a variety of data in FIG. 1.

FIG. 4 is a diagram illustrating a variety of data in FIG. 3. In the drawing, reference numeral 21 represents a physical quantity data group, reference numeral 22 represents an approximate ellipsoid parameter, reference numeral 23 represents a correction coefficient candidate group, reference numeral 24 represents a correction coefficient, reference numeral 25 represents a control parameter level, reference numeral 26 represents a control parameter group, reference numeral 27 represents a physical quantity data buffer, reference numeral 28 represents a correction coefficient candidate buffer, and reference numeral 29 represents a set of control parameter groups.

A physical quantity data correcting device according to the present invention can accurately and rapidly make a correction even under an influence of a variation in an external environment or a disturbance by causing a computation control unit 14 to appropriately control an approximate ellipsoid computing unit 12 and/or a correction coefficient computing unit 13 on the basis of a control parameter group.

The physical quantity data acquiring unit 11 acquires physical quantity data output from a physical quantity detecting unit that detects a physical quantity. The physical quantity detecting unit is not particularly limited and, for example, a magnetism detecting unit that detects magnetism, an acceleration detecting unit that detects acceleration, and an angular velocity detecting unit that detects an angular velocity may be used. The number of axes of the physical quantity detecting unit is not particularly limited as long as it is two or more, but two axes or three axes are suitable.

The data selecting unit 11a selects the physical quantity data acquired by the physical quantity acquiring unit 11. The approximate ellipsoid computing unit 12 computes an approximate expression of an n-dimensional ellipsoid indicating a distribution shape obtained by distributing the physical quantity data selected by the data selecting unit 11a in an n-axis (where n is an integer of two or greater) coordinate space.

The correction coefficient computing unit 13 computes a correction coefficient for correcting the n-dimensional ellipsoid computed by the approximate ellipsoid computing unit 12 to an n-dimensional sphere. The computation control unit 14 controls the approximate ellipsoid computing unit 12 and/or the correction coefficient computing unit 13 on the basis of the control parameter group 26.

The correction data output unit 15 corrects the physical quantity data on the basis of the correction coefficient computed by the correction coefficient computing unit 13 and outputs the corrected physical quantity data (correction physical quantity data).

The computation control unit 14 has the set of control parameter groups 29 including plural control parameter groups 26 which vary depending on the accuracy of the correction physical quantity data. A control parameter level 25 is set in each control parameter group 26, and the control parameter group 26 having a low control parameter level 25 has low accuracy of desired correction physical quantity data but has a small computation load and thus has a short time until the correction coefficient is calculated. On the other hand, the control parameter group 26 having a high control parameter level 25 has a large computation load and has a long time until the correction coefficient is calculated, but physical quantity data having high accuracy can be obtained therefrom.

The computation control unit 14 includes an accuracy setting unit that sets the accuracy of the corrected physical quantity data. The computation control unit 14 selects the control parameter group 26 from the set of control parameter groups 29 depending on the accuracy set by the accuracy setting unit and controls the approximate ellipsoid computing unit 12 and the correction coefficient computing unit 13 using the selected control parameter group 26. The accuracy setting unit may set target accuracy depending on the number of times in which the correction coefficient is calculated. For example, in a state where the correction coefficient is not calculated, such as immediately after the physical quantity data correcting device 10 is powered on, the accuracy setting unit sets the accuracy of the correction physical quantity data to be low so as to shorten the time until the correction coefficient is calculated. In a state where a sufficient number of correction coefficients are calculated, the accuracy setting unit sets the accuracy of the correction physical quantity data to be high so as to extend the time until the correction coefficient is calculated. The target accuracy may also be set by an input from a user.

The computation control unit 14 selects one control parameter group out of the set of control parameter groups 29. Then, the computation control unit controls the approximate ellipsoid computing unit 12 and the correction coefficient computing unit 13 using the selected control parameter group.

The control parameter group 26 includes a parameter for designating a range of elapsed time after the physical quantity data included in the physical quantity data group 21 is measured. The control parameter indicates a concept of a period of validity of the physical quantity data. Since geomagnetism or the like varies in distribution depending on place or time, it may be preferable that excessively-old physical quantity data not be used.

Figure 5:
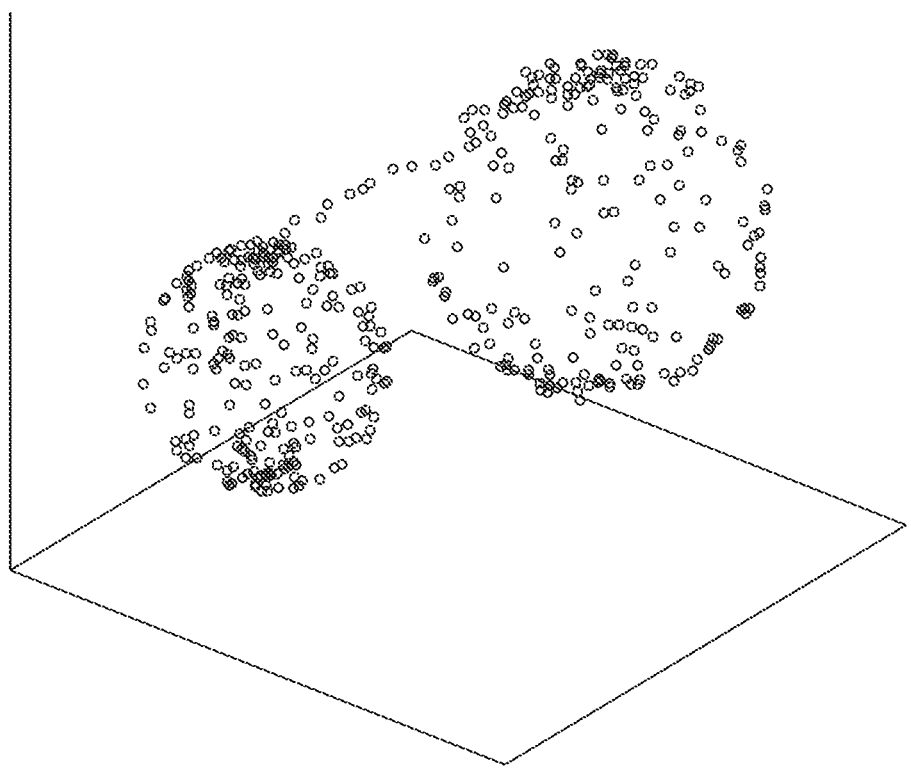
FIG. 5 is a diagram schematically illustrating a state where a distribution of measured geomagnetic values varies depending on place or time.

FIG. 5 is a diagram schematically illustrating a state where a distribution of measured geomagnetic values varies depending on place or time. In FIG. 5, since two geomagnetic measurement sphere distributions having different offset values and different geomagnetic intensities are illustrated, there is a possibility that an erroneous result will be calculated by performing approximate ellipsoid computation or correction coefficient computation under one geomagnetic environment using the physical quantity data obtained under the other geomagnetic environment.

The control parameter group 26 includes a parameter for designating a range of a difference between the physical quantity data included in the physical quantity data group 21 and the physical quantity data newly acquired by the physical quantity data acquiring unit 11. This parameter gives an effect of gaining a distribution angle of physical quantity data and improving the accuracy of the approximate ellipsoid computation by not loading the newly-acquired physical quantity data to the physical quantity data buffer with such a variation in noise level. In order to accurately acquire an approximate ellipsoid, the physical quantity data group needs to have a wide distribution angle so as to express the outline of the ellipsoid to a certain extent. In addition, when a simple noise input is unintentionally distributed in an ellipsoidal shape, the computation should not erroneously progress. Here, the distribution angle of the physical quantity data in the present invention is an angle obtained when the distribution of physical quantity data is seen from the center of the n-dimensional ellipsoid, is expressed as a normal angle for a two-dimensional physical quantity data distribution, and is expressed as a solid angle for a three-dimensional physical quantity data distribution.

Figure 6:
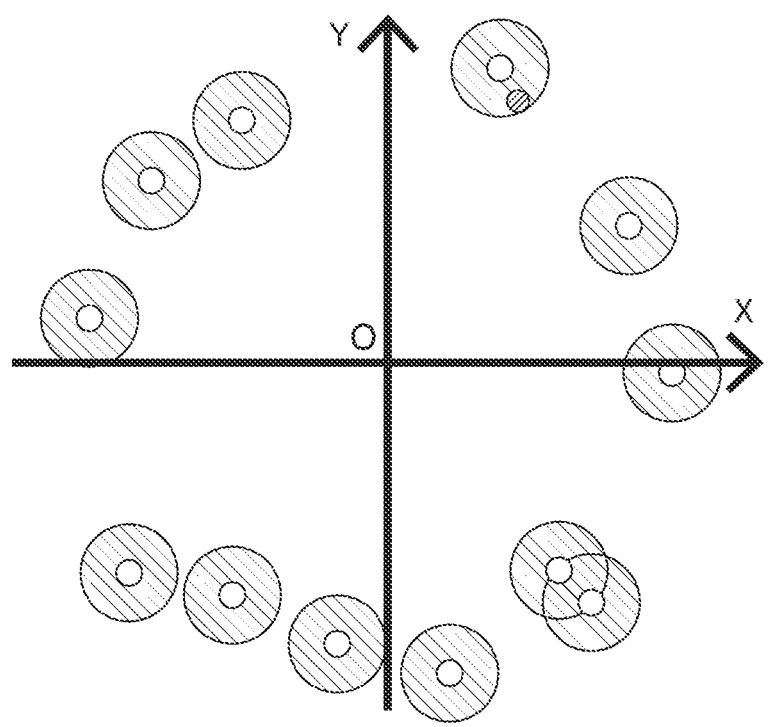
FIG. 6 is a diagram illustrating an (first) example of a physical quantity data buffer loading control using control parameters.

FIG. 6 is a diagram illustrating an (first) example of a physical quantity data buffer loading control using a control parameter. In this example, differences between the newly-acquired physical quantity data and data pieces included in the physical quantity data group are in a range designated by the control parameter, in which loading to the physical quantity data buffer is suppressed and thus the loading to the physical quantity data buffer is suppressed in this case.

Figure 7:
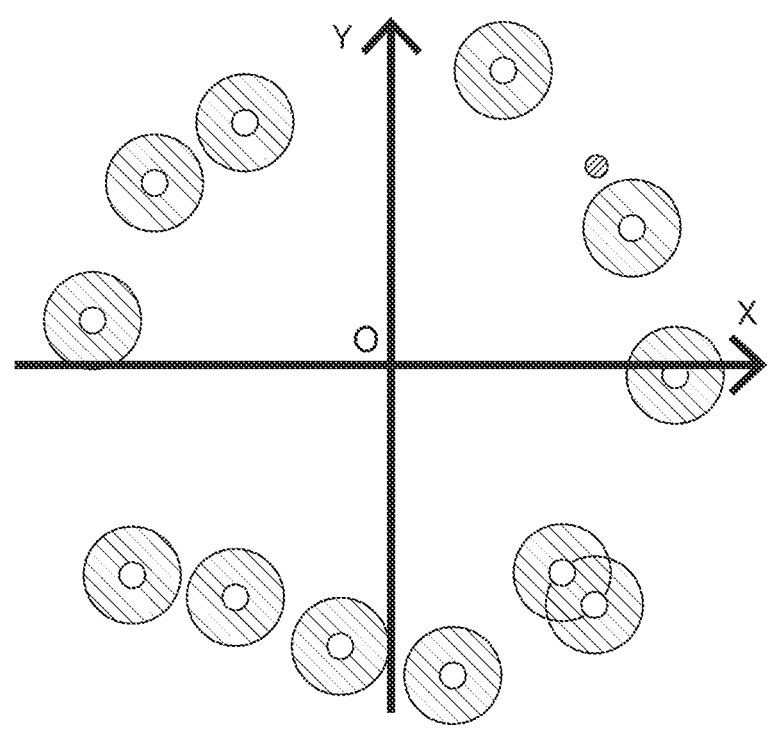
FIG. 7 is a diagram illustrating an (second) example of a physical quantity data buffer loading control using control parameters.

FIG. 7 is a diagram illustrating an (second) example of a physical quantity data buffer loading control using a control parameter. In this example, differences between the newly-acquired physical quantity data and data pieces included in the physical quantity data group are not in a range by the control parameter, in which loading to the physical quantity data buffer is suppressed and thus the loading to the physical quantity data buffer is performed in this case.

Figure 8:
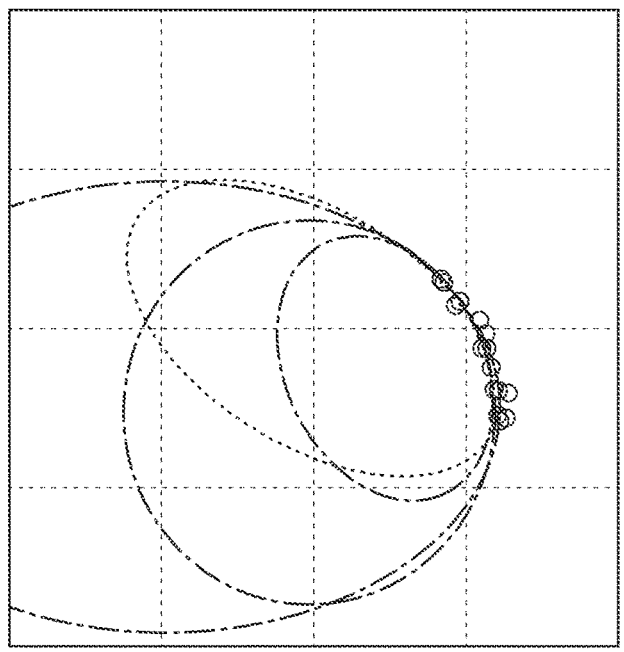
FIG. 8 is a (first) schematic diagram illustrating a relationship between a distribution of a physical quantity data group and computation of an approximate ellipsoid.

FIG. 8 is a (first) schematic diagram illustrating a relationship between the physical quantity data distribution and the computation of an approximate ellipsoid. In this example, since the physical quantity data distribution is biased and the distribution angle of the physical quantity data is small, an approximate ellipsoid greatly different from a correct approximate ellipsoid to be calculated in the computation of an approximate ellipsoid may be calculated.

Figure 9:
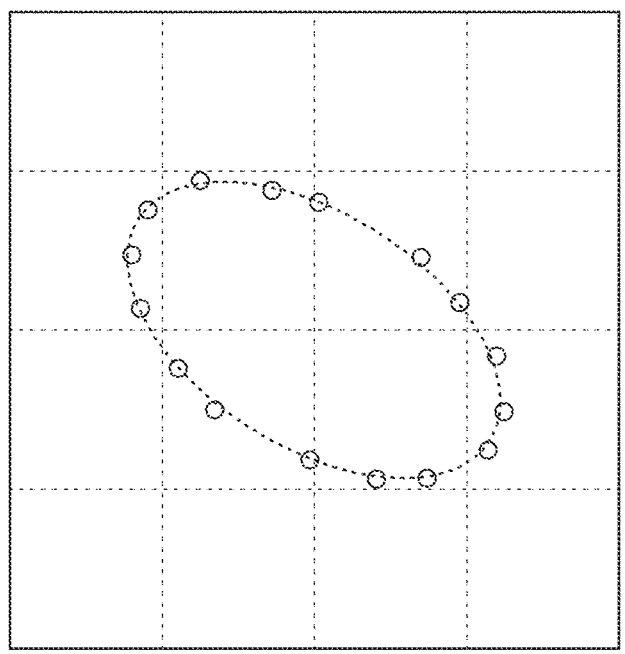
FIG. 9 is a (second) schematic diagram illustrating the relationship between a distribution of a physical quantity data group and computation of an approximate ellipsoid.

FIG. 9 is a (second) schematic diagram illustrating the relationship between the physical quantity data distribution and the computation of an approximate ellipsoid. In this example, the distribution angle of the physical quantity data is large and an approximate ellipsoid can be accurately calculated.

The data selecting unit 11a filters the physical quantity data acquired by the physical quantity data acquiring unit 11 on the basis of the n-dimensional volume of the n-dimensional ellipsoid. The two-dimensional volume of a two-dimensional ellipsoid is equal to the area of the two-dimensional ellipsoid.

The volume of an ellipsoid corresponds to the volume of a geomagnetic measurement sphere in terms of an electronic compass and corresponds to the volume of a measured value distribution sphere (gravitational force measurement sphere) formed by measured gravitational acceleration values in terms of an acceleration sensor. By setting a threshold value to be small when the ellipsoid is small and setting the threshold value to be large when the ellipsoid is large at the time of determination when loading the physical quantity data to the physical quantity data buffer or the like, it may be possible to dynamically adapt to an external environment and to obtain stable performance.

Figure 10:
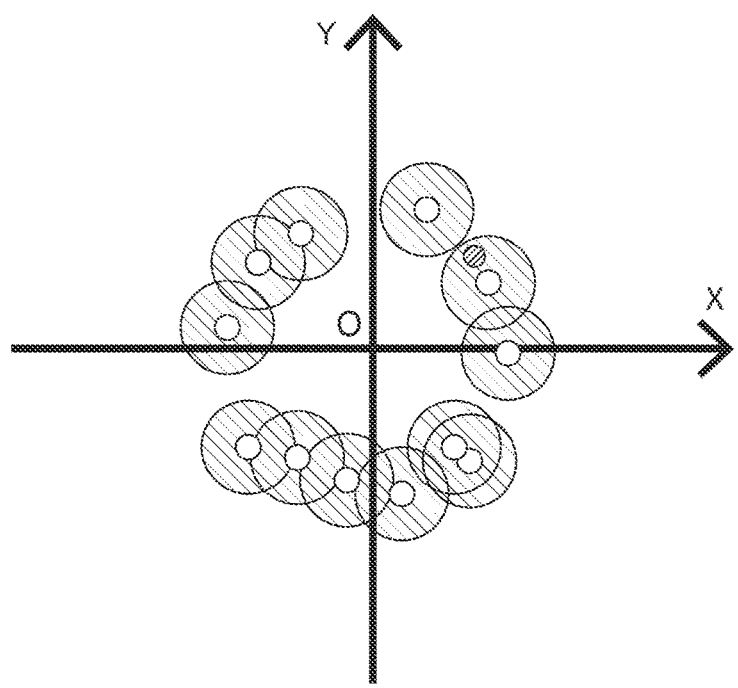
FIG. 10 is a (first) schematic diagram illustrating an effect of filtering physical quantity data on the basis of an n-dimensional volume of an n-dimensional ellipsoid.

FIG. 10 is a (first) schematic diagram illustrating an effect of filtering the physical quantity data on the basis of the n-dimensional volume of an n-dimensional ellipsoid and is a schematic diagram illustrating a state where the parameter for designating a range of differences between data pieces in the physical quantity data buffer and the newly-acquired physical quantity data is not changed when the volume of an ellipsoid in which measured values are distributed with the same distribution shape as illustrated in FIG. 7 decreases to ⅛. In this case, the distribution shape is the same as illustrated in FIG. 7, but the loading of the newly-acquired physical quantity data to the physical quantity data buffer is suppressed.

Figure 11:
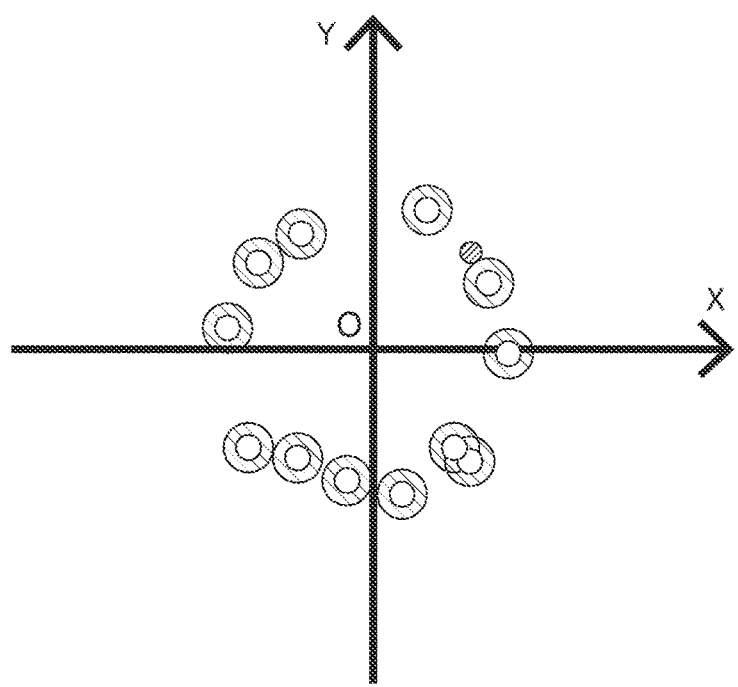
FIG. 11 is a (second) schematic diagram illustrating the effect of filtering physical quantity data on the basis of an n-dimensional volume of an n-dimensional ellipsoid.

FIG. 11 is a (second) schematic diagram illustrating the effect of filtering the physical quantity data on the basis of the n-dimensional volume of an n-dimensional ellipsoid and is a schematic diagram illustrating a state where the parameter for designating a range of differences between data pieces in the physical quantity data buffer and the newly-acquired physical quantity data in FIG. 10 is changed depending on the volume of an ellipsoid. In this case, similarly to FIG. 7, the loading of the newly-acquired physical quantity data to the physical quantity data buffer is performed.

The computation control unit 14 may select a physical quantity data group 21 for computing an n-dimensional ellipsoid from the physical quantity data acquired by the physical quantity data acquiring unit 11 on the basis of the control parameter group 26. The large number of physical quantity data pieces used in the computation for calculating an approximate ellipsoid causes further improvement in the computation accuracy, but the computational load or the space required for storing data increases. Accordingly, in order to optimize a computational load the number of data pieces can be employed to be in a range in which both are balanced well.

Figure 12:
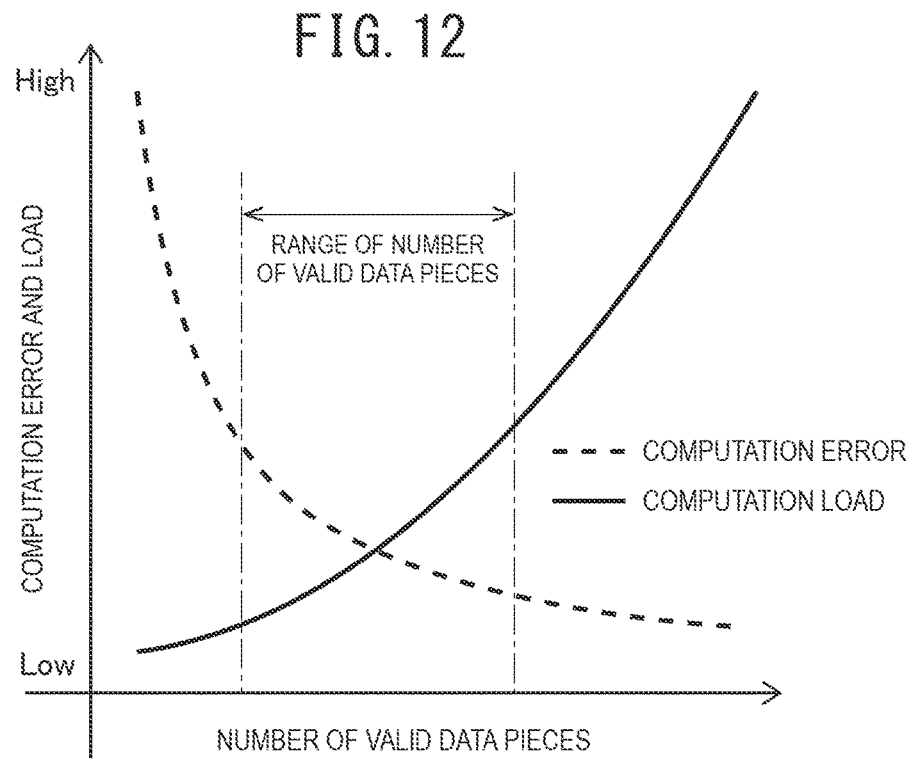
FIG. 12 is a diagram illustrating a range of the number of valid data.

FIG. 12 is a diagram illustrating a range of the number of valid data pieces. The number of valid data pieces having a good balance ranges, for example, from the number of valid data pieces corresponding to the upper limit of an allowable error to the number of valid data pieces corresponding to the upper limit of an allowable load.

The control parameter group 26 includes a parameter for evaluating validity of the computation of the approximate ellipsoid computing unit 12. In order to achieve improvement in accuracy of the approximate ellipsoid computation, it is checked whether the error between the physical quantity data group and the approximate ellipsoid is not great, whether the axial length of the computed approximate ellipsoid is valid, whether the volume of the computed approximate ellipsoid is valid, or the like.

The computation control unit 14 checks whether the axial length of the computed approximate ellipsoid is valid, whether the volume of the computed approximate ellipsoid is valid, or the like, for example, on the basis of the n-dimensional volume of the distribution shape obtained by distributing the physical quantity data in the n-axis coordinate space. When the check result is not valid, the computation control unit 14 controls the approximate ellipsoid computing unit 12 so as not to output the computation result of the approximate ellipsoid computing unit 12 to other functional blocks.

The control parameter group 26 includes a parameter for designating a range of disagreement between the physical quantity data distribution and the n-dimensional ellipsoid. In order to achieve the improvement in accuracy of the approximate ellipsoid computation, it is checked whether the error between the physical quantity data group and the approximate ellipsoid is not great.

The control parameter group 26 includes a parameter for designating a range of flatness of the physical quantity data distribution. In order to achieve the improvement in accuracy of the approximate ellipsoid computation, it is checked whether the distribution angle of the physical quantity data is not insufficient. Here, the flatness of the distribution in the present invention means that the distribution of n-dimensional physical quantity data approximately has equal to or less than (n−1) dimensions. For example, in FIG. 8, the two-dimensional physical quantity data group is distributed almost in a straight line shape and is approximately a one-dimensional distribution. As an index of the flatness of a distribution, the variance, the total sum, the average value, the maximum value, and the like of distances between the physical quantity data group and the approximate surface or line thereof can be used by approximating the distribution of the physical quantity data group in equal to or less than (n−1) dimensions.

The control parameter group 26 includes a parameter for designating a range of the axial length of an n-dimensional ellipsoid. When the axial length of the computed approximate ellipsoid is not abnormal or when the ratio of a major axis and a minor axis is excessively large, reliability of the corrected measured values may be low in spite of the correction. When all the axial lengths are excessively large or excessively small, the measurement environment may be abnormal.

The control parameter group 26 includes a parameter for designating a range of the volume of an n-dimensional ellipsoid. When the volume of the approximate ellipsoid is excessively large or excessively small, the measurement environment may be abnormal.

The correction coefficient computing unit 13 computes a correction coefficient on the basis of the correction coefficient candidate group 23 including plural correction coefficient candidates. In order to achieve improvement in accuracy and stabilization of the correction coefficient, it is checked whether similar result is stably obtained in a certain period. The computation results are averaged to achieve stabilization of the correction coefficient.

The computation control unit 14 evaluates the disagreement between the physical quantity data distribution and the n-dimensional ellipsoid, the flatness of the physical quantity data distribution, the axial length of the n-dimensional ellipsoid, the volume of the n-dimensional ellipsoid, and the like. When these values are not valid, the computation control unit 14 controls the approximate ellipsoid computing unit 12 so as not to output the computation result of the approximate ellipsoid computing unit 12 to other functional blocks. The computation control unit 14 may control the approximate ellipsoid computing unit 12 so as to stop the computation of the approximate ellipsoid computing unit 12 for a predetermined period of time or may control the approximate ellipsoid computing unit 12 so as to discard the physical quantity data acquired by the approximate ellipsoid computing unit 12. When the physical quantity data is discarded, the computation control unit 14 controls the approximate ellipsoid computing unit 12 so as to acquire the physical quantity data again.

The control parameter group 26 includes a parameter for designating a range of elapsed time after a correction coefficient candidate included in the correction coefficient candidate group 23 is computed. This control parameter indicates the concept of a period of validity for the correction coefficient candidate. Since the correction coefficient varies depending on a variation in environment in which the physical quantity data correcting device is used, it may be preferable that an excessively-old correction coefficient candidate not be used. Examples of the variation in environment include a temperature, a variation in magnetization quantity of a magnetic component mounted on the physical quantity data correcting device, and a variation in the positional relationship between internal components due to a variation in shape of the physical quantity data correcting device.

The computation control unit 14 controls the correction coefficient computing unit 13 so as to calculate the correction coefficient using the correction coefficient candidates in the period of validity.

The control parameter group 26 includes a parameter for designating a range of deviations of the correction coefficient candidate group 23. In order to achieve improvement in accuracy and stabilization of the correction coefficient, it is checked whether similar result is stably obtained in a certain period. A method of using the total sum of variance of the correction coefficient candidates for each parameter, the difference between the maximum value and the minimum value, and the total sum of the difference between the maximum value and the minimum value, and the like as the index of the deviations of the data pieces in the correction coefficient candidate buffer can be considered.

The computation control unit 14 controls the correction coefficient computing unit 13 so as to calculate the correction coefficient using the correction coefficient candidates in a predetermined range of deviations.

The control parameter group 26 includes a parameter for evaluating validity of the computation of the correction coefficient computing unit 13. In order to achieve improvement in accuracy of the correction coefficient computation, it is checked whether the correction coefficient can accurately correct the physical quantity data group, whether the deviations of the candidates of the correction coefficient candidate group is not large, or the like.

When the physical quantity detecting unit is a magnetism detecting unit that detects geomagnetism and the physical quantity data is geomagnetic data, the distribution shape of the correction physical quantity data is ideally a sphere with the magnitude of the geomagnetism as a radius. When the correction coefficient is not valid, the distribution shape of the correction physical quantity data is a sphere but the radius thereof may not be equal to the magnitude of the geomagnetism. The computation control unit 14 may evaluate the calculated correction coefficient, for example, on the basis of the n-dimensional volume of the distribution shape obtained by distributing the physical quantity data in the n-axis coordinate space. When the evaluation result is not valid, the computation control unit 14 controls the correction coefficient computing unit 13 on the basis of the n-dimensional volume so that the correction coefficient has an appropriate value. Specifically, when the physical quantity detecting unit is a magnetism detecting unit that detects geomagnetism, the computation control unit controls the correction coefficient computing unit 13 so that the distribution shape of the correction physical quantity data is a sphere with the magnitude of the geomagnetism as a radius.

The control parameter group 26 includes a parameter for evaluating validity of the existing correction coefficient when a previously-computed existing correction coefficient is present. When the physical quantity data is distributed in a spherical shape as the result of correcting the physical quantity data group with the existing correction coefficient, the measurement environment does not greatly vary and thus it can be determined that the validity of the existing correction coefficient is high. When the validity of the existing correction coefficient is high, it is possible to simplify the processes by waiting for next measured data without performing computation for computing a new correction coefficient. When the physical quantity data distribution greatly departs from an assumed spherical surface as the result of correcting the physical quantity data group with the existing correction coefficient, it can be guessed that a great variation is present in the measurement environment and it can be determined that the validity of the existing correction coefficient is low. When the validity of the existing correction coefficient is low, it is possible to rapidly cope with the variation in measurement environment by lowering the control parameter level 25 and resetting the physical quantity data buffer 27 or the correction coefficient candidate buffer 28.

The control parameter group 26 includes a parameter for designating a range of the number of valid physical quantity data pieces out of the physical quantity data included in the physical quantity data group 21. The larger number of physical quantity data pieces used for the computation causes further improvement in the computation accuracy, but the computational load or the space required for storing data increases. Accordingly, in order to optimize a computational load the number of data pieces can be employed to be in a range in which both are balanced well.

The control parameter group 26 includes a parameter for designating a range of the number of valid correction coefficient candidates out of the correction coefficient candidates included in the correction coefficient candidate group 23. The larger number of correction coefficient candidates causes further improvement in the computation accuracy, but the computational load or the space required for storing data increases. Accordingly, in order to optimize a computational load the number of data pieces can be employed to be in a range in which both are balanced well.

A correction coefficient 24 can be expressed as an n-order square matrix of which the determinant value is 1. The correction coefficient 24 represents expansion and contraction in the directions along n major axes of the n-dimensional ellipsoid. The correction coefficient 24 is calculated by the product of an orthogonal matrix for diagonalizing a coefficient matrix of the n-dimensional ellipsoid and an inverse matrix of the square root of the diagonal matrix obtained by diagonalizing the coefficient matrix of the n-dimensional ellipsoid.

The correction coefficient output from the correction coefficient computing unit 13 may be stored as the correction coefficient candidate group 23 in the computation control unit 14.

Figure 13:
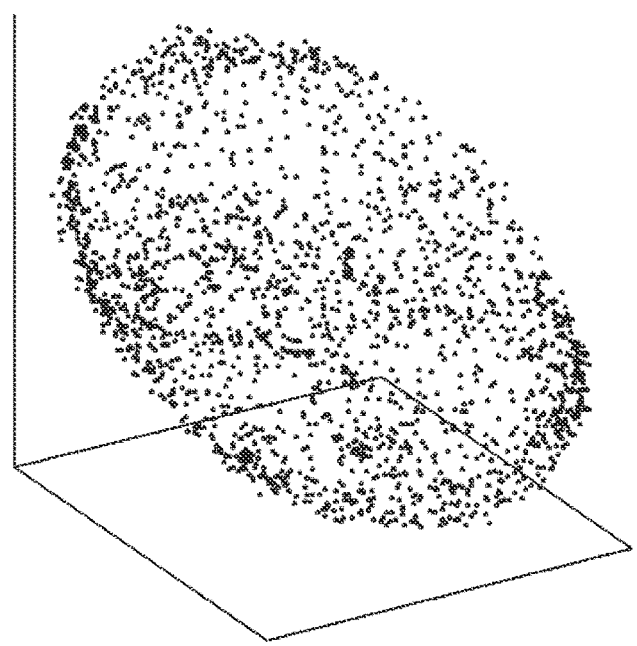
FIG. 13 is a (first) diagram illustrating a physical quantity data correcting flow according to the present invention.
Figure 14:
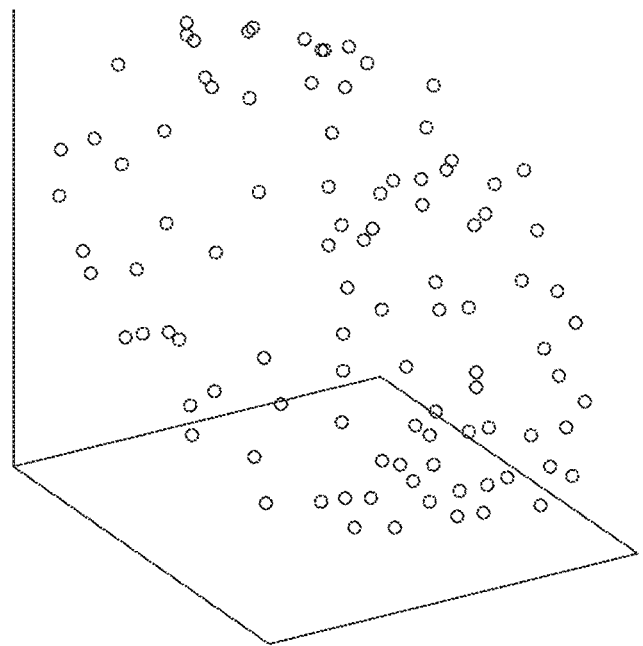
FIG. 14 is a (second) diagram illustrating the physical quantity data correcting flow according to the present invention.
Figure 15:
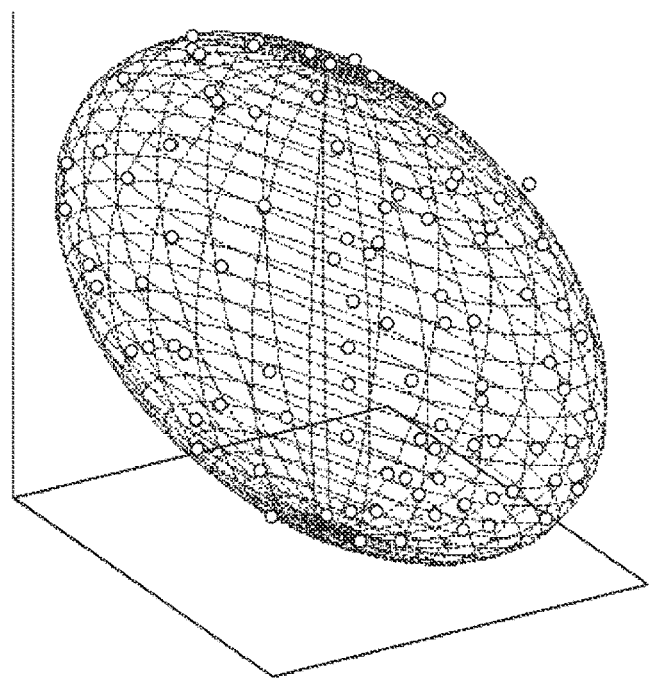
FIG. 15 is a (third) diagram illustrating the physical quantity data correcting flow according to the present invention.
Figure 16:
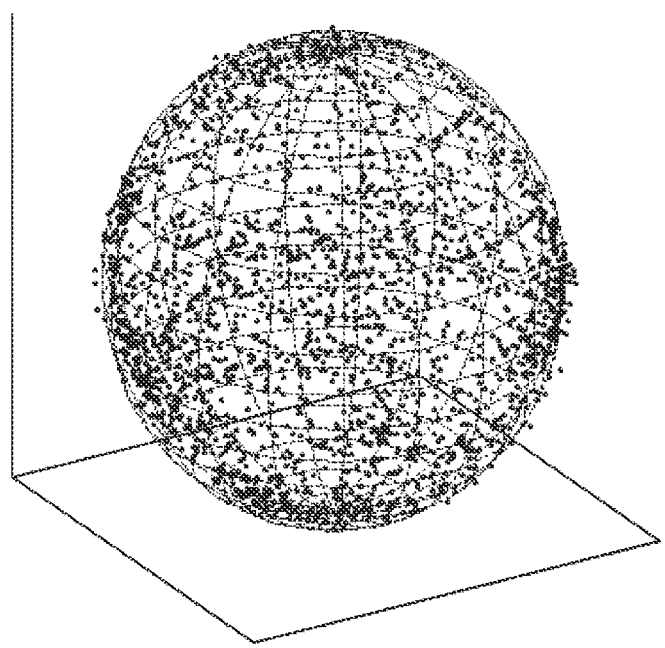
FIG. 16 is a (fourth) diagram illustrating the physical quantity data correcting flow according to the present invention.

FIGS. 13 to 16 are diagrams schematically illustrating a physical quantity data correction flow in the present invention. FIG. 13 is a conceptual diagram illustrating the distribution of the physical quantity data acquired by the physical quantity data acquiring unit, where the physical quantity data indicates a distribution deformed to an ellipsoidal shape due to a variation in an external environment or an influence of a disturbance. FIG. 14 illustrates the physical quantity data extracted depending on the control parameter group so as to compute an approximate ellipsoid of a physical quantity data distribution. FIG. 15 is a conceptual diagram illustrating an approximate ellipsoid calculated from the physical quantity data distribution extracted depending on the control parameter group. FIG. 16 is a conceptual diagram illustrating a correction physical quantity data distribution after being corrected on the basis of the correction coefficient calculated from the approximate ellipsoid, from which it can be seen that the physical quantity data distribution is corrected to a spherical distribution which is a distribution shape to be originally formed by the physical quantity data.

The correction data output unit 15 may output the correction data to a reference point calculating unit that calculates a reference point (center) of an n-dimensional sphere. When the physical quantity data is magnetic data output from the magnetism detecting unit that detects magnetism such as geomagnetism, the correction data output unit 15 may output the correction data to an azimuth calculating unit that calculates an azimuth.

In this way, it is possible to implement a physical quantity data correcting device that can accurately and rapidly make a correction even under an influence of a variation in an external environment or a disturbance by causing the computation control unit to appropriately control the approximate ellipsoid computing unit and/or the correction coefficient computing unit on the basis of the control parameter group.

A physical quantity data correcting method according to the present invention will be described below.

The physical quantity data correcting method according to the present invention can accurately and rapidly make a correction even under an influence of a variation in an external environment or a disturbance by causing the computation control unit 14 to appropriately control the approximate ellipsoid computing unit 12 and/or the correction coefficient computing unit 13 on the basis of a control parameter group.

The physical quantity data correcting method according to the present invention includes: a physical quantity data acquiring step of acquiring physical quantity data output from an n-axis (where n is an integer of two or greater) physical quantity detecting unit; an approximate ellipsoid computing step of computing an approximate expression of an n-dimensional ellipsoid approximating a distribution shape obtained by distributing the physical quantity data in an n-axis coordinate space; a correction coefficient computing step of computing a correction coefficient for correcting the n-dimensional ellipsoid to an n-dimensional sphere; a computation control step of controlling at least one of the approximate ellipsoid computing step and the correction coefficient computing step on the basis of a control parameter group; and a correction data output step of correcting the physical quantity data on the basis of the correction coefficient and outputting the corrected physical quantity data.

The physical quantity data correcting method may further include a data selecting step of selecting some physical quantity data out of the physical quantity data acquired by the physical quantity data acquiring unit on the basis of an n-dimensional volume of the distribution shape obtained by distributing the physical quantity data in the n-axis coordinate space and outputting the selected physical quantity data to the approximate ellipsoid computing unit.

The computation control step uses a set of control parameter groups including plural control parameters depending on the desired accuracy of correction physical quantity data.

The correction coefficient computing step includes a step of computing the correction coefficient on the basis of a correction coefficient candidate group including plural correction coefficient candidates.

The control parameter group includes a parameter for designating a range of elapsed time after the correction coefficient candidates included in the correction coefficient candidate group are computed. The control parameter group includes a parameter for designating a range of deviations of the correction coefficient candidates.

The control parameter group includes a parameter for designating a range of differences between the physical quantity data included in the physical quantity data group and the physical quantity data newly acquired in the physical quantity data acquiring step. The control parameter group includes a parameter for evaluating validity of the computation of the approximate ellipsoid computing step.

The control parameter group includes a parameter for evaluating validity of the computation of the correction coefficient computing step. The control parameter group includes a parameter for designating a range of disagreement between the distribution of the physical quantity data and the n-dimensional ellipsoid. The control parameter group includes a parameter for designating a range of flatness of the distribution of the physical quantity data.

The control parameter group includes a parameter for designating a range of an axial length of the n-dimensional ellipsoid. The control parameter group includes a parameter for designating a range of the volume of the n-dimensional ellipsoid. The control parameter group includes a parameter for evaluating validity of an existing correction coefficient when the previously-computed existing correction coefficient is present.

When the validity of the existing correction coefficient is high, the correction coefficient computing step is not performed. When the validity of the existing correction coefficient is low, the existing correction coefficient is reset.

The control parameter group includes a parameter for designating a range of the number of valid physical quantity data pieces out of the physical quantity data included in the physical quantity data group. The control parameter group includes a parameter for designating a range of the number of valid correction coefficient candidates out of the correction coefficient candidates included in the correction coefficient candidate group.

A correction coefficient can be expressed as an n-order square matrix of which the determinant value is 1. The correction coefficient represents expansion and contraction in the directions along n major axes of the n-dimensional ellipsoid. The correction coefficient is calculated by the product of an orthogonal matrix for diagonalizing a coefficient matrix of the n-dimensional ellipsoid and an inverse matrix of the square root of the diagonal matrix obtained by diagonalizing the coefficient matrix of the n-dimensional ellipsoid.

The computation control step includes a data group selecting step of selecting a physical quantity data group for computing the n-dimensional ellipsoid from the physical quantity data acquired in the physical quantity data acquiring step on the basis of the control parameter group.

Figure 17:
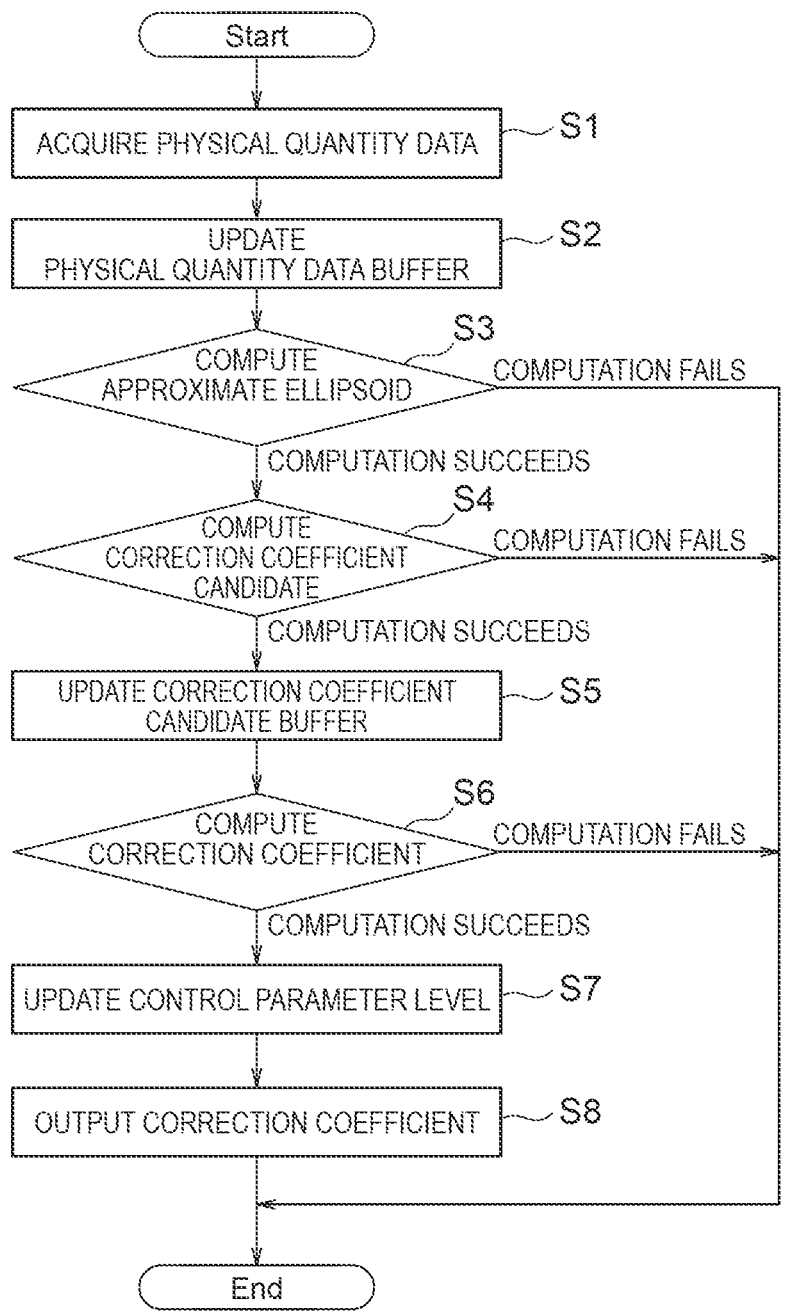
FIG. 17 is a (first) flowchart illustrating a specific computation process flow of a physical quantity data correcting method according to the present invention.

FIG. 17 is a (first) flowchart illustrating a specific computation process flow of the physical quantity data correcting method according to the present invention. First, physical quantity data is acquired (step S1). Then, the physical quantity data buffer is updated (step S2). Then, an approximate ellipsoid is computed (step S3). When the computation of the approximate ellipsoid fails, the computation process flow ends and the computation is restarted after new physical quantity data is measured. When the computation of the approximate ellipsoid succeeds, correction coefficient candidates are computed (step S4). Then, when the computation of the correction coefficient candidates succeeds, the correction coefficient candidate buffer is updated (step S5). Then, a correction coefficient is computed (step S6). When the computation of the correction coefficient succeeds, the control parameter level is updated (step S7). Then, the correction coefficient is output (step S8).

Figure 18:
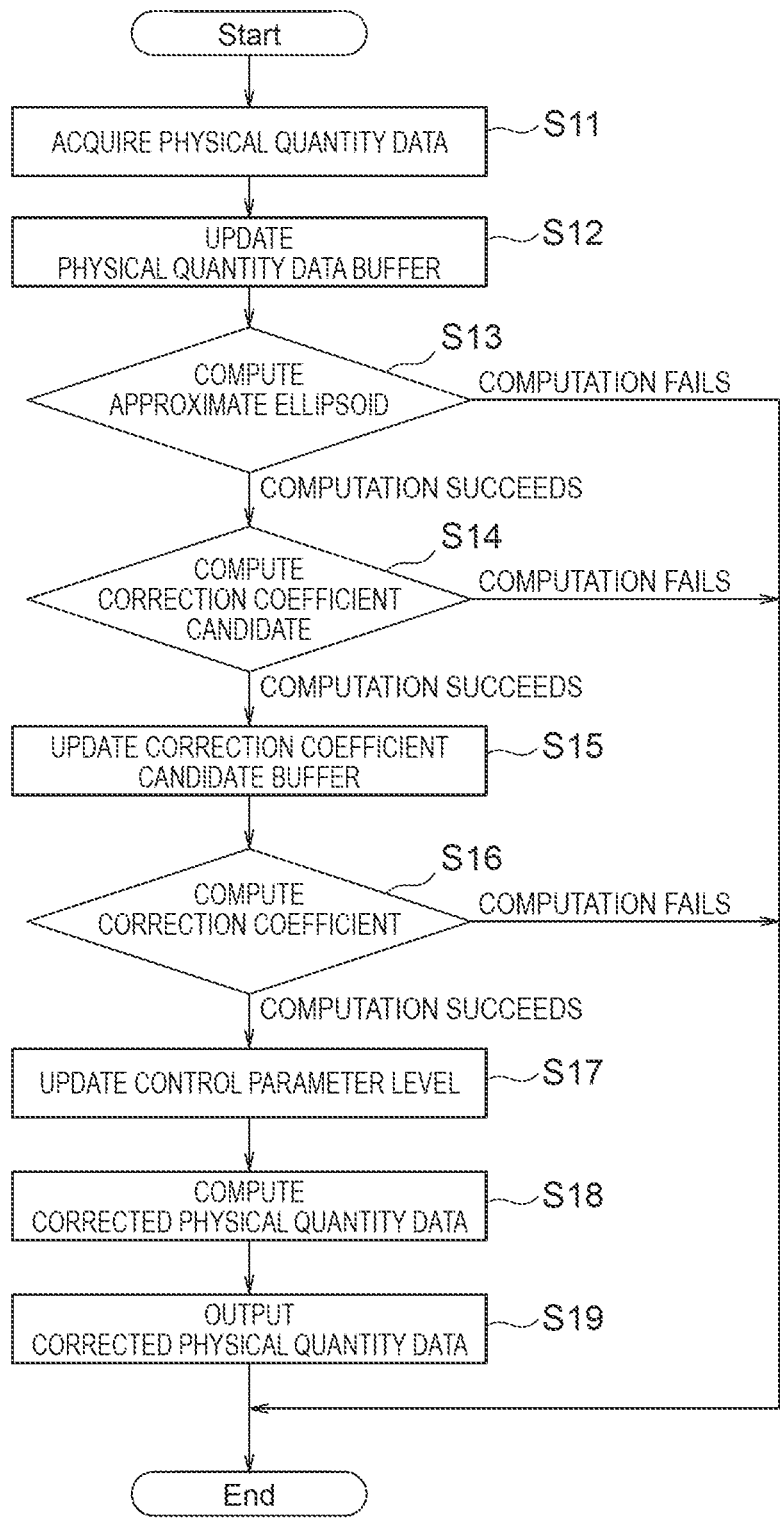
FIG. 18 is a (second) flowchart illustrating a specific computation process flow of the physical quantity data correcting method according to the present invention.

FIG. 18 is a (second) flowchart illustrating a specific computation process flow of the physical quantity data correcting method according to the present invention. First, physical quantity data is acquired (step S11). Then, the physical quantity data buffer is updated (step S12). Then, an approximate ellipsoid is computed (step S13). When the computation of the approximate ellipsoid fails, the computation process flow ends and the computation is restarted after new physical quantity data is measured. When the computation of the approximate ellipsoid succeeds, correction coefficient candidates are computed (step S14). Then, when the computation of the correction coefficient candidates succeeds, the correction coefficient candidate buffer is updated (step S15). Then, a correction coefficient is computed (step S16). When the computation of the correction coefficient succeeds, the control parameter level is updated (step S17). Then, correction physical quantity data is computed (step S18). Then, the correction physical quantity data is output (step S19).

Figure 19:
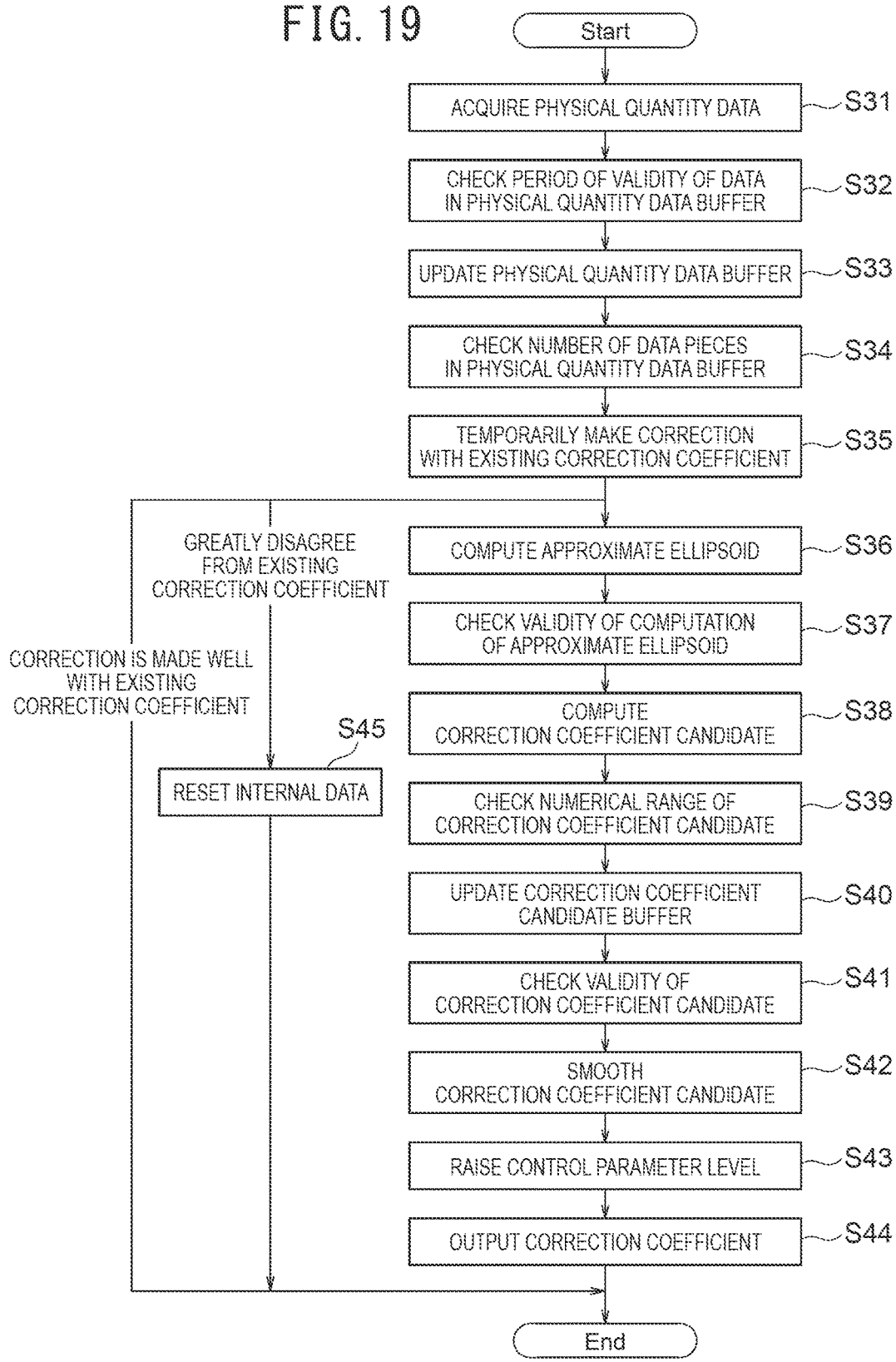
FIG. 19 is a flowchart illustrating a more specific computation process flow of the physical quantity data correcting method according to the present invention.

FIG. 19 is a flowchart illustrating a specific computation process flow of the physical quantity data correcting method according to the present invention. First, physical quantity data is acquired (step S31).

Then, the period of validity of data in the physical quantity data buffer is checked (step S32). An example of a specific method of step S32 is as follows. It is checked whether the elapsed time after the data in the physical quantity data buffer is measured is greater than the period of validity of physical quantity data designated by the control parameter group, and old data of which the period of validity expires is discarded. In the method of determining the period of validity, the acquisition time along with the physical quantity data is recorded at the time of acquiring the physical quantity data in step S31, and the acquired physical quantity data is determined to be valid when the difference between the acquisition time of the data in the physical quantity data buffer and the current time is within the period of validity of the physical quantity data designated by the control parameter group, and is determined to be invalid otherwise. Alternatively, a counter value indicating the period of validity of the physical quantity data designated by the control parameter group may be set along with the physical quantity data at the time of acquiring the physical quantity data in step S31, the counter value may be counted down whenever new physical quantity data is acquired in step S31, and the period of validity may be determined to be expire when the counter value is 0.

Then, the physical quantity data buffer is updated (step S33). An example of a specific method of step S33 is as follows. The minimum value of the absolute values of the differences between new physical quantity data acquired in step S31 and the data pieces in the physical quantity data buffer is calculated and compared with a threshold value designated by the control parameter group. The new physical quantity data is loaded to the physical quantity data buffer when the minimum value of the differences is greater than the threshold value as the comparison result, the oldest data (or data giving the minimum value of the absolute values of the differences) in the physical quantity data buffer is discarded when the number of data pieces in the physical quantity data buffer reaches the upper limit at that time. When the minimum value of the absolute values of the differences is not greater than the threshold value as the comparison result, the physical quantity data buffer updating process ends and next physical quantity data is waited for. When the data in the physical quantity data buffer giving the minimum value of the absolute values of the differences is physical quantity data immediately adjacent thereto, the physical quantity data buffer updating process may not end but the data may be replaced with new physical quantity data. In another physical quantity data buffer updating method, the accuracy of the rear computation of an approximate ellipsoid can be improved by updating the physical quantity data buffer so that the physical quantity data group has a wide distribution angle.

FIG. 20 is a diagram illustrating an (first) example of a method of loading new physical quantity data to the physical quantity data buffer. In the drawing, the left side represents the physical quantity data buffer before being updated and the right side represents the physical quantity data buffer after being updated. In the example illustrated in FIGS. 20 to 23, the value of the control parameter at the time of loading new physical quantity data to the physical quantity data buffer is set so as to load the new physical quantity data to the physical quantity data buffer when the absolute values of the differences between the data pieces in the physical quantity data buffer and the new physical quantity data are greater than 10. For the purpose of simplification, the number of data pieces in the physical quantity data buffer is set to 8.

In FIG. 20, since the absolute values of the differences between the data pieces in the physical quantity data buffer and the new physical quantity data are greater than 10, the new physical quantity data is loaded and the oldest physical quantity data is discarded.

FIG. 21 is a diagram illustrating an (second) example of the method of loading new physical quantity data to the physical quantity data buffer. In FIG. 21, since there are plural physical quantity data pieces in which the absolute values of the differences between the data pieces in the physical quantity data buffer and the new physical quantity data are greater than 10, the loading of new physical quantity data is suppressed.

FIG. 22 is a diagram illustrating an (third) example of the method of loading new physical quantity data to the physical quantity data buffer. In FIG. 22, there is physical quantity data in which the absolute values of the differences between the data pieces in the physical quantity data buffer and the new physical quantity data are greater than 10, but the data is the newest data in the physical quantity data buffer and thus the physical quantity data buffer is updated by replacing the data with the newly-measured physical quantity data.

Figures 23, 24, 25:
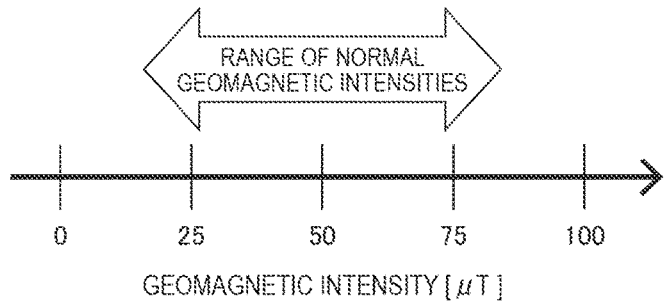
FIG. 23 is a diagram illustrating an (fourth) example of the method of loading new physical quantity data to the physical quantity data buffer.
FIG. 24 is a diagram schematically illustrating a range of normal geomagnetic intensities.
FIG. 25 is a diagram illustrating examples of principal control parameter groups.

FIG. 23 is a diagram illustrating an (fourth) example of the method of loading new physical quantity data to the physical quantity data buffer. In FIG. 23, as the method of updating the physical quantity data buffer when the absolute values of the differences between the data pieces in the physical quantity data buffer and the new physical quantity data are greater than 10, a method of updating the physical quantity data buffer by replacing the data in the physical quantity data buffer in which the absolute value of the difference from the new physical quantity data is the minimum is used.

Then, the number of data pieces in the physical quantity data buffer is checked (step S34). An example of a specific method of step S34 is as follows. It is checked whether the number of data pieces in the physical quantity data buffer is greater than a threshold value of the necessary number of data pieces designated by the control parameter group, the process flow ends when the number of data pieces is not greater than the threshold value, and next physical quantity data is waited for. In case of three dimensions, since the number of unknowns for determining an ellipsoid is 9, the minimum necessary number of data pieces is 9, but it is effective to increase the necessary number of data pieces when an influence of noise included in the physical quantity data is considered. From the viewpoint of the computational load, since the number of data pieces used for the computation excessively increases, the computational load increases and thus it is effective that the necessary number of data pieces has an upper limit.

The physical quantity data is temporarily corrected with an existing correction coefficient (step S35). An example of a specific method of step S35 is as follows. When a certain correction coefficient is previously calculated, the physical quantity data group is temporarily corrected with the existing correction coefficient, and the subsequent process is skipped when the deviation of the data pieces in the physical quantity data buffer from a spherical surface in which the physical quantity data is predicted to be distributed as the temporary correction result is equal to or less than a threshold value designated by the control parameter group. When the physical quantity data group is corrected well with the existing correction coefficient, it is not necessary to calculate a new correction coefficient and it is thus possible to reduce the load of the computation process. When the deviation of the data pieces in the physical quantity data buffer from a spherical surface in which the physical quantity data is predicted to be distributed as the temporary correction result is equal to or greater than the threshold value designated by the control parameter group, a process of considering that the surrounding environment greatly varies, resetting internal data (step S45), and performing the process flow again is effective in the improvement on the followability to the surrounding environment. At this time, the threshold value for determining whether to skip the subsequent process and the threshold value for determining whether to reset the internal data may be different from each other. Examples of an index indicating the deviation of the data pieces in the physical quantity data buffer from the spherical surface in which the physical quantity data is predicted to be distributed as the temporary correction result include the variance, the total sum, the average value, and the maximum value of the distances between the spherical surface and the data pieces in the physical quantity data buffer.

Then, an approximate ellipsoid is computed (step S36). Least square fitting to the ellipsoid is performed using the number of data pieces in the physical quantity data buffer designated by the control parameter group. Approximate ellipsoid parameters corresponding to the coefficient matrix and the center coordinate of the ellipsoid and the volume of the ellipsoid are acquired.

Then, the validity of the computation of the approximate ellipsoid is checked (step S37). An example of a specific method of step S37 is as follows. Through comparison with a threshold value designated by the control parameter group, it is checked whether the volume of the ellipsoid is valid, whether the distribution angle of the physical quantity data used for the fitting is sufficient, and whether the error between the approximate ellipsoid and the physical quantity data group used for the fitting does not cause any problem. The valid range of the volume of the ellipsoid can be considered to correspond to a range of 20 micro tesla to 70 micro tesla which is the general magnitude of geomagnetism on the earth, for example, when the physical quantity data is geomagnetic data (FIG. 24). When the physical quantity data is acceleration data, the valid range of the volume of the ellipsoid can be considered to correspond to 9.8 m/s/s which is the general gravitational acceleration on the earth. An example of the method of checking whether the distribution angle of the physical quantity data group used for the fitting is sufficient is a method of calculating an approximate surface of the physical quantity data group used for the fitting and determining whether the distribution angle is sufficient using the maximum value of the distances between the approximate surface and the physical quantity data group used for the fitting. When the maximum value of the distances between the approximate surface and the physical quantity data group used for the fitting is equal to or greater than ½ of the short axis of the approximate ellipsoid, a method of determining that the physical quantity data group used for the fitting is sufficiently multidimensionally distributed or the like can be used.

Then, the correction coefficient candidates are computed (step S38). An example of a specific method of step S38 is as follows. The coefficient matrix of the ellipsoid is diagonalized using a shift-QR method or the like. Since the components of the diagonal matrix obtained by the diagonalization correspond to squares of the axial lengths of the ellipsoid, the physical quantity data distributed in the ellipsoidal shape can be corrected to a spherical shape by converting the components into the same value. A matrix for implementing this conversion can be obtained by taking the reciprocal of the square root of the diagonal matrix. The product of the diagonal matrix including reciprocals of the square roots of the diagonal matrix and the orthogonal matrix for implementing diagonalization can be used as the correction coefficient candidates.

Then, the numerical range of the correction coefficient candidates is checked (step S39). An example of a specific method of step S39 is as follows. It is checked whether the eigenvalues of the correction coefficient candidates are within a range of values designated by the control parameter group. For example, it can be considered that the eigenvalues of the correction coefficient candidates designated by the control parameter group range from 0.5 to 2.0. Since the eigenvalues of the correction coefficient candidates correspond to the reciprocals of the axial lengths of the approximate ellipsoid, the ratio of the major axis and the minor axis of the approximate ellipsoid is limited to be less than 4 in this example. When a large correction coefficient value is used, the noise or the error is amplified at the same time as amplifying a signal. Accordingly, the distribution of the physical quantity data can be corrected but the corrected physical quantity data may not be practical. In order to exclude this situation, it is effective to check the numerical value of the correction coefficient candidates.

Then, the correction coefficient candidate buffer is updated (step S40). An example of a specific method of step S40 is as follows. The correction coefficient candidates are loaded to the correction coefficient candidate buffer and the period of validity is set. It is checked whether the elapsed time after the data in the correction coefficient candidate buffer is computed is greater than the period of validity of a correction coefficient candidate designated by the control parameter group. Old data of which the period of validity expires is discarded. Another method described in step S32 may be used for the period of validity of the correction coefficient candidates.

Then, the validity of the correction coefficient is checked (step S41). An example of a specific method of step S41 is as follows. It is checked whether the number of data pieces in the correction coefficient candidate buffer is equal to or greater than a threshold value designated by the control parameter group and it is also checked whether the deviations in the data in the correction coefficient candidate buffer is equal to or less than a value designated by the control parameter group. By comparing the plural correction coefficient candidates and checking that the values are stabilized, it is possible to determine that the data in the correction coefficient candidate buffer is valid. A method of using the total sum of the variances of the correction coefficient candidates for each parameter, the difference between the maximum value and the minimum value, the total sum of the differences between the maximum value and the minimum value, and the like can be considered as an index of the deviations of the data pieces in the correction coefficient candidate buffer.

Then, the correction coefficient is smoothed (step S42). An example of a specific method of step S42 is as follows. As a simplest method, a method of using the average value of the correction coefficient candidates in the correction coefficient candidate buffer as the correction coefficient or a method of determining the strength of the filter depending on the validity of the computation of the approximate ellipsoid calculated in step S37 or the validity of the correction coefficient calculated in step S41 using an adaptive IIR filter as smoothing means may be used.

Then, the control parameter level is raised (step S43). The control parameter level for switching the control parameter group is updated. Then, the correction coefficient is output (step S44).

FIG. 25 is a diagram illustrating examples of principal control parameter groups.

In this way, it is possible to implement a physical quantity data correcting method that can accurately and rapidly make a correction even under an influence of a variation in an external environment or a disturbance by causing a computation control unit to appropriately control an approximate ellipsoid computing unit and/or a correction coefficient computing unit on the basis of a control parameter group.

The physical quantity data which can be used in the present invention is not particularly limited to the geomagnetic data or the acceleration data. For example, the present invention can be similarly applied to flow rate data of a fluid or radiation data of electromagnetic waves or the like.

REFERENCE SIGNS LIST

10: physical quantity data correcting device
11: physical quantity data acquiring unit
11a: data selecting unit
12: approximate ellipsoid computing unit
13: correction coefficient computing unit
14: computation control unit
15: correction data output unit
21: physical quantity data group
22: approximate ellipsoid parameter
23: correction coefficient candidate group
24: correction coefficient
25: control parameter level
26: control parameter group
27: physical quantity data buffer
28: correction coefficient candidate buffer
29: set of control parameter groups

The invention claimed is:
1. A physical quantity data correcting device comprising:
a physical quantity data acquiring unit that acquires physical quantity data output from an n-axis (where n is an integer of two or greater) physical quantity detecting unit;
an approximate ellipsoid computing unit that computes an approximate expression of an n-dimensional ellipsoid approximating a distribution shape obtained by distributing the physical quantity data in an n-axis coordinate space;
a correction coefficient computing unit that computes a correction coefficient for correcting the n-dimensional ellipsoid to an n-dimensional sphere;

a computation control unit that has a control parameter group, and controls at least one of the approximate ellipsoid computing unit and the correction coefficient computing unit on the basis of the control parameter group; and a correction data output unit that corrects the physical quantity data on the basis of the correction coefficient and that outputs corrected physical quantity data, wherein the computation control unit sets accuracy of the corrected physical quantity data, and the control parameter group varies depending on the accuracy of the corrected physical quantity data; and wherein the control parameter group includes a parameter for evaluating validity of the computation of the approximate ellipsoid computing unit or validity of the computation of the correction coefficient computing unit.

2. The physical quantity data correcting device according to claim 1, wherein the parameter for evaluating the validity of the computation of the approximate ellipsoid computing unit or the validity of the computation of the correction coefficient computing unit is a parameter based on the n-dimensional volume of the distribution shape obtained by distributing the physical quantity data in the n-axis coordinate space.

3. A physical quantity data correcting method comprising:

a physical quantity data acquiring step of acquiring physical quantity data output from an n-axis (where n is an integer of two or greater) physical quantity detecting unit;

an approximate ellipsoid computing step of computing an approximate expression of an n-dimensional ellipsoid approximating a distribution shape obtained by distributing the physical quantity data in an n-axis coordinate space;

a correction coefficient computing step of computing a correction coefficient for correcting the n-dimensional ellipsoid to an n-dimensional sphere;

a computation control step of controlling at least one of the approximate ellipsoid computing step and the correction coefficient computing step on the basis of a control parameter group; and a correction data output step of correcting the physical quantity data on the basis of the correction coefficient and outputting corrected physical quantity data, wherein the computation control step sets accuracy of the corrected physical quantity data, and the control parameter group varies depending on the accuracy of the corrected physical quantity data; and wherein the control parameter group includes a parameter for evaluating validity of the computation of the approximate ellipsoid computing step or validity of the computation of the correction coefficient computing step.

4. A program causing a computer to function as the physical quantity data correcting device according to claim 1.

* * * * *